(12) United States Patent
Foltin

(10) Patent No.: US 10,717,436 B2
(45) Date of Patent: Jul. 21, 2020

(54) METHOD AND DEVICE FOR MONITORING AN AREA AHEAD OF A VEHICLE

(71) Applicant: Robert Bosch GmbH, Stuttgart (DE)

(72) Inventor: Johannes Ludwig Foltin, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 132 days.

(21) Appl. No.: 15/567,275

(22) PCT Filed: Mar. 2, 2016

(86) PCT No.: PCT/EP2016/054366
§ 371 (c)(1),
(2) Date: Oct. 17, 2017

(87) PCT Pub. No.: WO2016/169685
PCT Pub. Date: Oct. 27, 2016

(65) Prior Publication Data
US 2018/0105169 A1    Apr. 19, 2018

(30) Foreign Application Priority Data

Apr. 22, 2015   (DE) .................. 10 2015 207 375

(51) Int. Cl.
*B60W 30/095*   (2012.01)
*G01S 13/86*    (2006.01)
(Continued)

(52) U.S. Cl.
CPC ........... *B60W 30/095* (2013.01); *G01S 13/72* (2013.01); *G01S 13/867* (2013.01); *G01S 13/931* (2013.01);
(Continued)

(58) Field of Classification Search
USPC ...................................... 701/301.3
See application file for complete search history.

(56) References Cited

U.S. PATENT DOCUMENTS

| 7,337,650 B1 * | 3/2008 | Preston | .................. B60W 40/11 73/1.38 |
| 2007/0073473 A1 * | 3/2007 | Altan | .................... G01S 13/726 701/518 |

(Continued)

FOREIGN PATENT DOCUMENTS

| EP | 2293118 A1 * | 3/2011 | ........... G01S 13/931 |
| EP | 2293118 A1 | 3/2011 | |

(Continued)

*Primary Examiner* — James M McPherson
*Assistant Examiner* — Sharon Carlson
(74) *Attorney, Agent, or Firm* — Norton Rose Fulbright US LLP; Gerard Messina

(57) ABSTRACT

A method for monitoring an area ahead of a vehicle, the vehicle including a first sensor oriented in the direction of the area and a second sensor oriented in the direction of the area, the second sensor having a greater vertical detection angle than the first sensor, in a step of associating, an item of distance information detected by the first sensor is associated with an object detected by the second sensor in the area. In a step of tracking, a position of the object is tracked while using the second sensor when the object leaves the detection angle of the first sensor due to a pitch angle of the vehicle.

10 Claims, 2 Drawing Sheets

(51) Int. Cl.
*G01S 13/931* (2020.01)
*G06T 7/246* (2017.01)
*G01S 13/72* (2006.01)
*G06K 9/00* (2006.01)

(52) U.S. Cl.
CPC .......... *G06K 9/00805* (2013.01); *G06T 7/246* (2017.01); *B60W 2420/42* (2013.01); *B60W 2420/52* (2013.01); *G01S 2013/932* (2020.01); *G01S 2013/93271* (2020.01); *G06T 2207/30261* (2013.01)

(56) References Cited

U.S. PATENT DOCUMENTS

| | | | | |
|---|---|---|---|---|
| 2010/0191391 | A1* | 7/2010 | Zeng | G01S 13/723 701/1 |
| 2013/0058527 | A1* | 3/2013 | Peynot | G01S 7/497 382/103 |

FOREIGN PATENT DOCUMENTS

| | | | | |
|---|---|---|---|---|
| JP | 2006048435 | A | * | 2/2006 |
| JP | 2006048435 | A | | 2/2006 |
| JP | 2013117475 | A | * | 6/2013 |
| JP | 2013117475 | A | | 6/2013 |

* cited by examiner

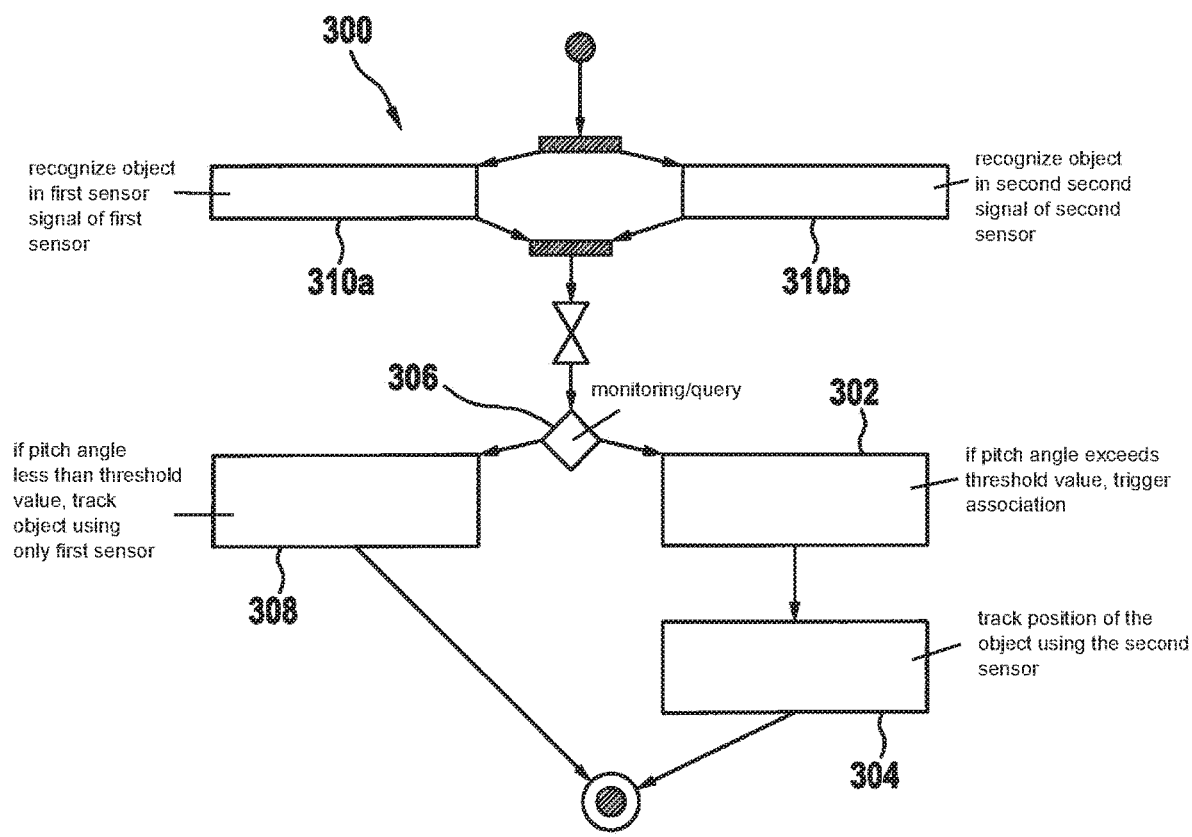

METHOD AND DEVICE FOR MONITORING AN AREA AHEAD OF A VEHICLE

FIELD

The present invention is directed to a device or a method according to the definition of the species in the independent claims. The present invention is also directed to a computer program.

BACKGROUND INFORMATION

A vehicle may carry out a pitching motion during an acceleration process or a deceleration process. A sensor which is fixedly connected to the vehicle may lose an object from its detection area due to the pitching motion.

Conventionally, triggering is frequently carried out using two items of sensor information. The signals which result in the triggering usually only come from a first sensor, however. Thus, for example, in the case of an emergency brake assistant, an object is recognized by the radar sensor and the relative velocity and/or the crash time is predicted. A second sensor (for example, a video sensor) is used to supply an object confirmation and enable the emergency braking. The signal which results in the triggering of the emergency brake assistant (i.e., the prediction of the crash time) generally only comes from the first sensor, however.

SUMMARY

An example method for monitoring an area ahead of the vehicle, furthermore a device which uses this method, and finally a corresponding computer program in accordance with the present invention are provided. Advantageous refinements of and improvements on the device are possible, for example, by way of the measures described herein.

When the sensor loses the object from its detection area due to the pitching motion, the object may be tracked further with the aid of a further sensor. For this purpose, the further sensor may have a larger detection area than the first sensor.

To be able to track the object reliably using the further sensor, a data fusion of data of the first sensor with data of the further sensor may be carried out. In particular, a reference distance of the object may be transmitted.

A method for monitoring an area ahead of the vehicle is provided, the vehicle having a first sensor oriented in the direction of the area and a second sensor oriented in the direction of the area, the second sensor having a greater vertical detection angle than the first sensor, the method including the following steps:

associating an item of distance information detected by the first sensor with an object detected by the second sensor in the area; and tracking a position of the object while using the second sensor when the object leaves the detection angle of the first sensor due to a pitch angle of the vehicle.

An area ahead of the vehicle may be understood in particular to mean a traffic area to be traveled in the future by the vehicle. The first sensor and the second sensor may be anticipatory sensors. An item of distance information may represent a distance between an object and the vehicle.

The step of associating may be carried out when the pitch angle is greater than a threshold angle. The item of distance information may thus be transmitted as long as the object is detected by both sensors.

The object may be tracked using a horizontal angle and/or a vertical angle covered by the object. The second sensor may be a direction-sensitive sensor. In other words, the object may be tracked via a position in sensor data of the second sensor. The angle covered by the object may be converted via trigonometric calculations into a distance value by way of the reference distance.

Furthermore, a position change of the object may be ascertained in the step of tracking. An evasive movement of the object may thus be tracked, for example.

Furthermore, a relative velocity between the vehicle and the object, which is detected by the first sensor, may be associated with the object in the step of associating. The relative velocity may influence an expected change of the sensor data of the second sensor.

A change of the relative velocity may be tracked in the step of tracking. A predicted impact velocity may thus be updated.

The first sensor may be a radar sensor and the second sensor may be a video sensor. A radar sensor may measure the distance via a signal propagation time, for example. A video sensor or a camera may detect a lateral and a horizontal position of the object in the image.

This method may be implemented, for example, in software or hardware or in a mixed form of software and hardware, for example, in a control unit.

The approach presented here furthermore provides a device which is designed to carry out, control, and/or implement the steps of a variant of a method provided here in corresponding units. The object on which the present invention is based may also be achieved rapidly and efficiently by this embodiment variant of the present invention in the form of a device.

A device may be understood to mean in the present case an electrical device, which processes sensor signals and outputs control and/or data signals as a function thereof. The device may include an interface, which may be designed in hardware and/or software. In the case of a hardware design, the interfaces may be part of a so-called system ASIC, for example, which includes greatly varying functions of the device. However, it is also possible that the interfaces are separate integrated circuits or are at least partially constructed from discrete components. In the case of a software design, the interfaces may be software modules which are present on a microcontroller in addition to other software modules, for example.

A computer program product or computer program having program code is also advantageous, which may be stored on a machine-readable carrier or storage medium such as a semiconductor memory, a hard drive memory, or an optical memory, and is used to carry out, implement, and/or control the steps of the method according to one of the above-described specific embodiments, in particular when the program product or program is executed on a computer or a device.

Exemplary embodiments of the present invention are shown in the figures and explained in greater detail below.

BRIEF DESCRIPTION OF THE DRAWINGS

FIG. 3 shows a flow chart of a method for monitoring an area ahead of a vehicle according to one exemplary embodiment.

DETAILED DESCRIPTION OF EXAMPLE EMBODIMENTS

Figure 1:
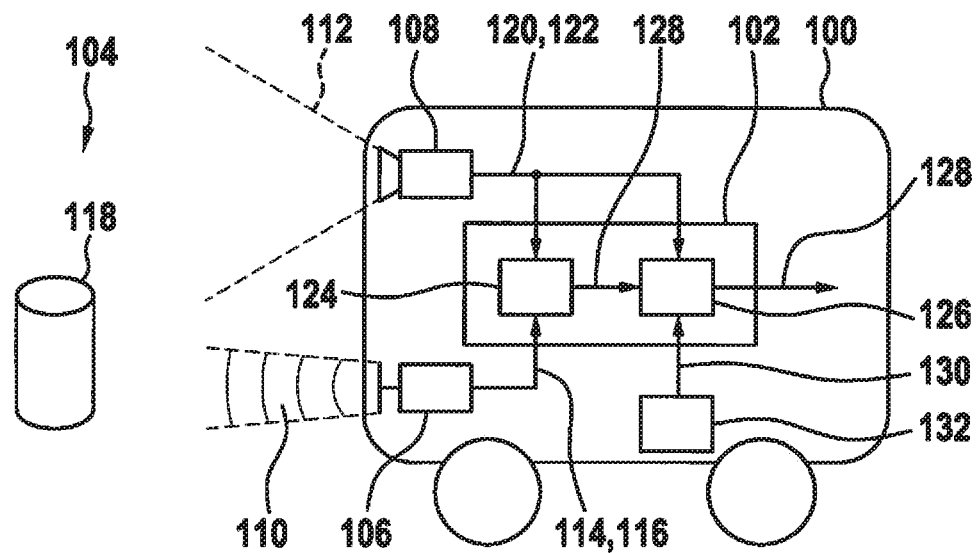
FIG. 1 shows an illustration of a vehicle having a device according to one exemplary embodiment.

In the description below of advantageous exemplary embodiments of the present invention, identical or similar reference numerals are used for the elements which are shown in the various figures and act similarly, a repeated description of these elements being omitted.

FIG. 1 shows an illustration of a vehicle 100 including a device 102 according to one exemplary embodiment. Device 102 is designed to monitor an area 104 ahead of vehicle 100. Device 102 is connected for this purpose to a first sensor 106 of vehicle 100 and a second sensor 108 of vehicle 100. Both sensors 106, 108 are oriented toward area 104. First sensor 106 has a first vertical detection angle 110. Second sensor 108 has a second vertical detection angle 112. Second detection angle 112 is greater than first detection angle 110. Second detection angle 112 completely covers first detection angle 110 from a certain distance here.

First sensor 106 provides a first sensor signal 114. At least one item of distance information 116 is contained in first sensor signal 114. Item of distance information 116 represents a distance between vehicle 100 and an object 118 situated inside first detection angle 110.

Second sensor 108 provides a second sensor signal 120. At least one item of object information 122 of object 118 is contained in second sensor signal 120, since object 118 is detected by second sensor 108. Item of object information 122 represents a position of object 118 inside second detection angle 112.

Device 102 has a unit 124 for associating and a unit 126 for tracking. Unit 124 for associating is designed to associate item of distance information 116 with item of object information 122 from second sensor 108. The distance is thus associated with object 118 and an instantaneous spatial position 128 of object 118 as a distance and angle is known. By way of a time-delayed further association of the distance, which is then updated, with object 118, a relative velocity may also be associated with object 118. Unit 126 for tracking is designed to track position 128 of object 118 while using item of object information 122 of second sensor 108, when object 118 leaves detection angle 110 of first sensor 106 due to a pitch angle 130 of vehicle 100.

Pitch angle 130 is provided by a pitch angle sensor 132 of vehicle 100. The pitch angle sensor may also be replaced, for example, by an image evaluation unit. A dedicated sensor is not absolutely necessary.

In another specific embodiment, first sensor 106 detects that the object has disappeared from first detection area 110 due to a pitching motion of the vehicle, for example, but is still detected by second sensor 108.

In one exemplary embodiment, first sensor 106 is a radar sensor. Second sensor 108 is a camera.

When vehicle 100 carries out a pitching motion, for example, due to a deceleration or acceleration, first sensor 106 may lose object 118 from its detection angle 110. Therefore, functions of vehicle 100 which exclusively evaluate first sensor signal 114 cannot obtain distance information 116 about object 118 until vehicle 100 ends the pitching motion and first sensor 106 is again oriented toward object 118.

By way of the approach presented here, object 118 may be tracked in second sensor signal 120 as long as the vehicle carries out the pitching motion. A relative position of object 118 in relation to vehicle 100 may be derived from angle information 122 with a high level of confidence, since the distance to object 118 is known at the beginning of the tracking.

In particular, a position change of object 118 may be tracked in second sensor signal 120. A relative velocity between vehicle 100 and object 118 may also be tracked.

In the approach presented here, a utilization of camera data 120 is proposed in the event of strong pitching of vehicle 100. A switchover takes place based on pitch angle 130 of vehicle 100.

In the event of emergency braking, vehicle 100 pitches very strongly, for which reason a crash-relevant object 118 in particular may disappear from detection area 110 of radar sensor 106. By utilizing radar information 114 for initializing camera information 120, camera information 120, which is normally less suitable, may subsequently be used for crash prediction. This is important in particular for a safety system (ISS, integrated safety system) of vehicle 100.

In one exemplary embodiment, the system, for example, an airbag triggering algorithm, is set on the basis of surroundings sensors 106, 108. Surroundings sensors 106, 108, for example, a camera 108, a radar 106, a LIDAR or ultrasonic system, detect surroundings 104 and ascertain a possible imminent crash and crash type. The airbag control unit may be set more sensitively, so that triggering of the restraint systems may occur more rapidly.

Thus, for example, a frontal collision with a vehicle may be predicted by radar sensor 106. During the predicted time at which the accident is supposed to occur, the activation threshold for restraint systems is reduced, which results in a more sensitive and earlier reaction. If a possible accident is registered by the classical sensors of the passive safety, for example, acceleration sensors and/or impact sensors, it is possible to react thereto more rapidly, since the plausibility check duration may be limited.

Depending on the configuration level, it is possible to predict a frontal collision or lateral collision or react to a rear collision. In collisions, it is possible to differentiate between various other parties involved in an accident, for example, a vehicle may be differentiated from a truck or a pedestrian or a fixedly anchored object 118.

A collision recognition always has the prerequisite that an accident has already taken place or is unavoidable and will take place. Only the reaction time is shortened, whereby the vehicle occupants may be better prepared for the accident. For example, more space may be provided to dissipate kinetic energy and thus avoid acceleration peaks.

The basic functionality of crash sensing using acceleration sensors, etc., remains in place.

The safety system functions of pre-trigger (for activating reversible occupant protection means) and of pre-fire (for activating irreversible occupant protection means) may be understood as forms in which restraint systems are activated even before a contact occurs between the parties in the accident. Various surrounding sensors 106, 108 are used for the sensing.

A differentiation is made between pre-fire of reversible actuators and pre-trigger of non-reversible, for example, pyrotechnic actuators. Airbags and seat-belt tensioners may be activated, the latter also frequently reversibly (pre-fire).

Various surroundings sensors 106, 108 may have different properties and measuring principles.

Radar and LIDAR systems 106 are active sensors which emit a signal, for example, a pulse or a frequency ramp, which is reflected on objects 118 and received again. By evaluating the emitted signal with the received signal, for example, via its propagation time, variables in the direction of the emitted signal may also be inferred.

In general, distance and relative velocity, sometimes also relative acceleration, may thus be measured in the travel direction if sensor 106 is installed in the travel direction.

Vertical aperture angle 110 of radar sensor 106 or LIDAR sensor is generally small, to detect preferably few interfering signals of the irrelevant surroundings, such as streetlights above vehicle 100.

Radar sensor 106 is installed in such a way that it emits and receives signals in parallel to the level road.

A typical aperture angle 112 of camera 108 is, for example, 10° upward, to recognize streetlights which are sufficiently close, and 10° downward, to recognize lane markings.

Pitching motions may be ascertained in the image, for example, on the basis of road markings or via inertial sensors and may be used during the recognition and/or measuring of objects 118 to keep the recognition robust with respect to pitching motions.

The pitch angle may also be obtained in a model-based manner in addition to an explicit computation. Thus, for example, the pitch angle may be estimated on the basis of the acceleration signals, optionally with the aid of the vehicle mass and mass distribution. A further model-based pitch angle estimation is the duration of the emergency brake signal and/or the engagement of the antilock braking system: from a certain duration, a maximum deceleration is built up, from which the pitch angle may in turn be inferred.

The pitch angle may also be measured indirectly, by ascertaining a change of the object position in the sensors and comparing it to the ascertained object distance.

If the object is close to the detection area of first sensor 106, a switchover may already be carried out, since a certain pitching motion may be presumed.

If vehicle 100 pitches strongly, for example, due to an intense brake application, initiated by the driver or an emergency brake assistant, relevant object 118 may no longer be located in radar sensor detection area 110 due to the pitching motion.

The variables which are relevant for the ISS functions in the travel direction, such as the distance, the relative velocity, and the time to impact or the estimated crash time, may therefore no longer be updated using radar sensor 106. Changes of the relevant variables may no longer be measured and taken into consideration exclusively using the radar sensor.

This may be taken into consideration in the design of the safety system function. The possible crash window may be selected to be larger in the case of a collision recognition, for example.

Therefore, in the approach presented here, the utilization of sensor data 114 from a sensor 106 having a small vertical aperture 110 up to a sensor 108 having a larger vertical aperture 112 is adapted as a function of pitch angle 130 of vehicle 100.

In other words, camera measured data 120 are used for crash prediction if pitch angle 130 is large.

In one exemplary embodiment, radar sensor 106 measures longitudinal data 116 of an object 118. Subsequently, vehicle 100 pitches, for example, due to emergency braking before an accident, whereby object 118 disappears from detection area 110 of radar sensor 106. A switch therefore takes place from radar sensor 106 to video sensor 108, which has a larger vertical detection area 112. For this purpose, object 118 is initialized by video sensor 108 using data 116 of the travel direction, in particular the position and relative velocity of radar sensor 106. After the initialization, the actual relative velocity or the size of object 118 may be measured from scaling information 122, i.e., a change of the view angle together with distance 116. By way of the measurement of object 118 by radar sensor 106, sufficient items of information are present at the beginning to also carry out an accurate crash prediction by way of video sensor 108.

The vehicles may be tracked further even in the event of strong pitching motions by way of the approach presented here, whereby more accurate and more targeted triggering of restraint systems becomes possible.

In another exemplary embodiment, vehicle 100 has a LIDAR sensor 106 or another sensor 106, which has a comparatively small vertical detection angle 110 above the horizon line, instead of radar sensor 106. In particular, sensors 106 are used which are able to measure longitudinal variables 116 along the travel axis or X axis.

Second sensor 108 may be a mono camera, a stereo camera, or another camera sensor. Sensors 108 which measure an angle ahead of vehicle 100 are preferably used.

Using camera 108, it is possible to use the scaling information of entire object 118, for example, a vehicle rear or parts of the vehicle, such as the license plate or the taillights, to measure the relative movement.

Figure 2:
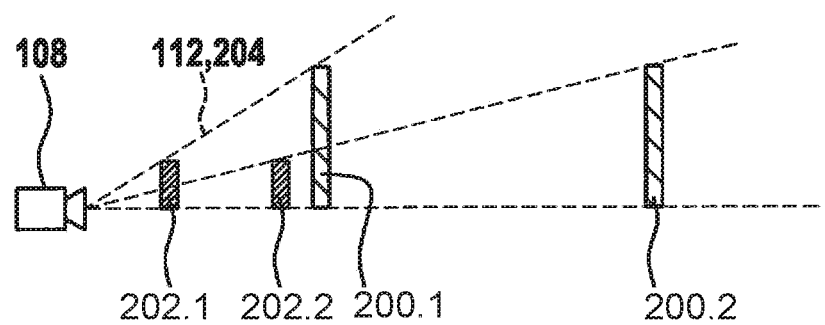
FIG. 2 shows an illustration of a view angle of a camera as a function of the distance.

FIG. 2 shows an illustration of a view angle 112 of a camera 108 as a function of the distance. A faraway object 200 appears smaller in an image of camera 108 than a close object 202 due to geometrical laws. However, as long as an absolute distance of objects (200.1, 200.2, 202.1, 202.2) (200.1 and 200.2 refer to the same "large" object at different points in time; 202.1 and 202.2 reference to the same "small" object at different points in time) from camera 108 is unknown, no statement about an actual size of objects (200.1, 200.2, 202.1, 202.2) may be made without additional information about objects 200.1, 200.2, 202.1, 202.2.

If a small object (202.1, 202.2) close to camera 108 carries out a small relative movement in relation to camera 108 (e.g., 202.1 to 202.2), an identical change results of an angle 204 occupied by object (202.1, 202.2) in the image as when a large object (200.1, 200.2) remote from camera 108 carries out a large relative movement in relation to camera 108 (e.g., 200.1 to 200.2).

In the approach presented here, such restrictions caused by the system in the distance determination using a monocular camera 108 are canceled out by referencing the distance to object (200.1, 200.2, 202.1, 202.2) while using an item of distance information from another sensor. The position of object (200.1, 200.2, 202.1, 202.2) may thus be tracked after the referencing while using a horizontal angle 204 and/or vertical angle 204 covered by object (200.1, 200.2, 202.1, 202.2).

Camera systems 108 generally passively detect an image of the surroundings. Camera system 108 may also be enhanced using an active light source. Camera system 108 may carry out a depth measurement with the aid of time-of-flight. Camera system 108 may measure dimensions accurately, for example, by counting pixels. A pixel position corresponds to the view angle.

Distances may only be ascertained in a model-based manner by passive mono camera systems 108, which results in a high level of inaccuracy.

Camera system 108 may ascertain relative movements via the change of the dimension or the scaling factor. However, the distance at which the distance change takes place may only be ascertained inaccurately. In the near range, the scaling change is greater than in the far range, the method is therefore particularly suitable for close objects (202.1, 202.2).

In FIG. 2, the actual object size and the object distance are unknown, which is shown by equal view angles 204 in the case of dark object (202.1, 202.2) and light object (200.1, 200.2). The relative movement may be ascertained from the size difference, but is not absolute. Small dark object (202.1, 202) has a lower relative velocity at equal angular change per unit of time than light large object (200.1, 200.2).

The closer a vehicle comes, the larger it becomes in the image. This information may be detected in a camera image as a view angle 204. In contrast to the estimation of the distance, a model assumption is not necessary for the size measurement.

FIG. 3 shows a flow chart of a method 300 for monitoring an area ahead of a vehicle according to one exemplary embodiment. Method 300 may be carried out, for example, on a device as shown in FIG. 1. Method 300 has a step 302 of associating and a step 304 of tracking. In step 302 of associating, an item of distance information detected by a first sensor of the vehicle is associated with an object detected by a second sensor of the vehicle in the area. In step 304 of tracking, a position of the object is tracked using the second sensor when the object leaves a detection angle of the first sensor due to a pitch angle of the vehicle.

In one exemplary embodiment, continuous monitoring 306 of the pitch angle takes place. If the pitch angle exceeds a threshold value, association 302 is triggered. If the pitch angle is less than the threshold value, in an alternative step 308 of tracking, the object is only tracked using the first sensor.

A step 310 of recognizing takes place preceding monitoring 306. Step 310 of recognizing has two partial steps 310a, 310b. In first partial step 310a, the object is recognized in the first sensor signal of the first sensor. In second partial step 310b, the object is recognized in the second sensor signal of the second sensor.

In other words, FIG. 3 shows a flow chart for an emergency brake assistant. The emergency brake assistant recognizes a critical situation and initiates an emergency brake application to avoid an accident.

In general, sensors, for example, radar sensors, measure the distance to the other involved vehicle and the relative velocity and thus ascertain the last possible time to prevent an accident.

The relative velocity and the position are important in ISS functions, for which reason the functions are frequently implemented using radar sensors.

During pitching procedures, such as emergency braking, the radar sensor or a sensor having a small vertical aperture may lose objects in the near range.

Heretofore, in the event of strong pitching due to the braking, the last measured values may be maintained or triggering of the brake may not be permitted for a certain time, unless the driver overreacts via the gas pedal.

The movement of the other vehicle may also be extrapolated. Changes in the vehicle dynamics of the other object then remain unconsidered, however.

In the sequence shown in FIG. 3, recognition 310 of the object by the first sensor and the second sensor takes place first. A query 306 then follows as to whether an emergency brake application is initiated. If negative, a crash prediction 308 takes place on the basis of the first sensor. If affirmative, an initialization 302 of data of the second sensor using data of the first sensor and subsequently crash prediction 304 based on the fused data of the second sensor take place.

The first sensor has a small vertical aperture angle above the horizon line and the second sensor has a larger aperture angle above the horizon line.

At the beginning, the relevant object is detected by both sensors. It is advantageous for sensor data fusion to already take place at this time, but this is not absolutely necessary. The vehicle is still in a relatively normal state, i.e., no braking or partial braking, and is at least not yet strongly pitched, so that the object may still be recognized by the first sensor.

The objects may still be measured for a while, which is shown by an hourglass, to clarify that this does not have to take place in the same computing cycle.

It is also always measured whether the vehicle meanwhile strongly pitches or whether an emergency brake application has been carried out.

If no emergency brake application is carried out, the crash time may then be obtained in a standard manner using the first sensor, for example, a radar sensor.

If emergency brake application is carried out, the data measured previously by the first sensor are used to adjust or initialize the data of the second sensor.

The crash prediction is then carried out on the basis of the fused or optimized data of the second sensor.

If an exemplary embodiment includes an "and/or" linkage between a first feature and a second feature, this is thus to be read in such a way that the exemplary embodiment includes both the first feature and the second feature according to one specific embodiment and includes either only the first or only the second feature according to another specific embodiment.

What is claimed is:

1. A method for monitoring an area ahead of a vehicle, the vehicle including a first sensor oriented toward the area and having a first vertical detection angle and a second sensor oriented toward the area and having a second vertical detection angle, the second vertical detection angle being greater than the first vertical detection angle, the method comprising the following steps:
   detecting, using the first sensor, a distance between an object in the first vertical detection angle and the vehicle;
   detecting, using the second sensor, the object within the second vertical detection angle;
   tracking a position of the object using the first sensor and not the second sensor;
   detecting a pitch angle of the vehicle, the pitch angle being an angle of the vehicle toward a road on which the vehicle is located;
   determining the pitch angle of the vehicle is greater than a predetermined threshold angle;
   associating an item of distance information representing the distance detected by the first sensor with the object detected by the second sensor within the second vertical detection angle; and
   based on the determining that the pitch angle of the vehicle is greater than the redetermined threshold angle, switching from tracking the position of the object using the first sensor and not the second sensor to tracking the position of the object using the second sensor and not the first sensor.

2. The method as recited in claim 1, wherein the associating step is performed only when the pitch angle is greater than the predetermined threshold angle.

3. The method as recited in claim 1, wherein in the tracking step, a position change of the object is ascertained.

4. The method as recited in claim 1, wherein in the associating step, a relative velocity between the vehicle and the object is detected by the first sensor, and is associated with the object.

5. The method as recited in claim 4, wherein in tracking step, a change of the relative velocity is tracked.

6. The method as recited in claim 1, wherein a radar sensor is the first sensor and a video sensor is the second sensor.

7. A device for monitoring an area ahead of a vehicle, the vehicle including a first sensor oriented toward the area and having a first vertical detection angle and a second sensor oriented toward the area and having a second vertical detection angle, the vertical detection angle being greater than the first vertical detection angle than the first sensor, the device designed to:
- detect, using the first sensor, a distance between an object in the first vertical detection angle and the vehicle;
- detect, using the second sensor, the object within the second vertical detection angle;
- tracking a position of the object using the first sensor and not the second sensor;
- detect a pitch angle of the vehicle, the pitch angle being an angle of the vehicle toward a road on which the vehicle is located;
- associate an item of distance information representing the distance detected by the first sensor with the object detected by the second sensor within the second vertical detection angle; and
- when the detected pitch angle of the vehicle is greater than the predetermined threshold angle, switch from tracking the position of the object using the first sensor and not the second sensor to tracking the position of the object using the second sensor and not the first sensor.

8. A non-transitory machine-readable storage medium on which is stored a computer program for monitoring an area ahead of a vehicle, the vehicle including a first sensor oriented toward the area and having a first vertical detection angle and a second sensor oriented toward the area and having a second vertical detection angle, the second vertical detection angle being greater than the first vertical detection angle the computer program, when executed by a processor, causing the processor to perform the following steps:
- detecting, using the first sensor, a distance between an object in the first vertical detection angle and the vehicle;
- detecting, using the second sensor, the object within the second vertical detection angle;
- tracking a position of the object using the first sensor and not the second sensor;
- detecting a pitch angle of the vehicle, the pitch angle being an angle of the vehicle toward a road on which the vehicle is located;
- determining the pitch angle of the vehicle is greater than a predetermined threshold angle;
- associating an item of distance information representing the distance detected by the first sensor with the object detected by the second sensor within the second vertical detection angle; and
- based on the determining that the pitch angle of the vehicle is greater than the predetermined threshold angle, switching from tracking the position of the object using the first sensor and not the second sensor to tracking the position of the object using the second sensor and not the first sensor.

9. The method as recited in claim 1, Therein the pitch angle of the vehicle is detected using a pitch angle sensor of the vehicle.

10. The method as recited in claim 1, wherein the pitch angle of the vehicle is detected using image evaluation.

* * * * *